June 17, 1930. C. E. HOPPES 1,764,077
HANGER
Filed Feb. 29, 1928
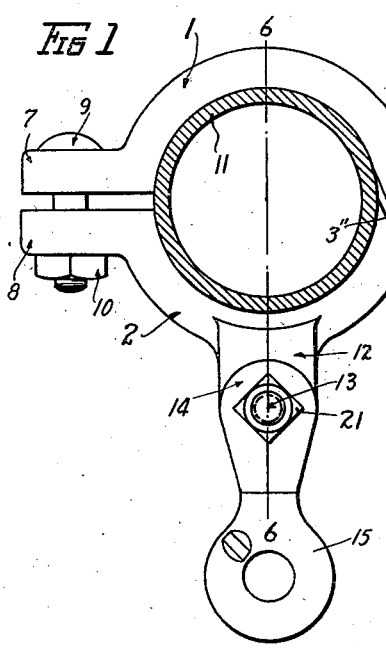
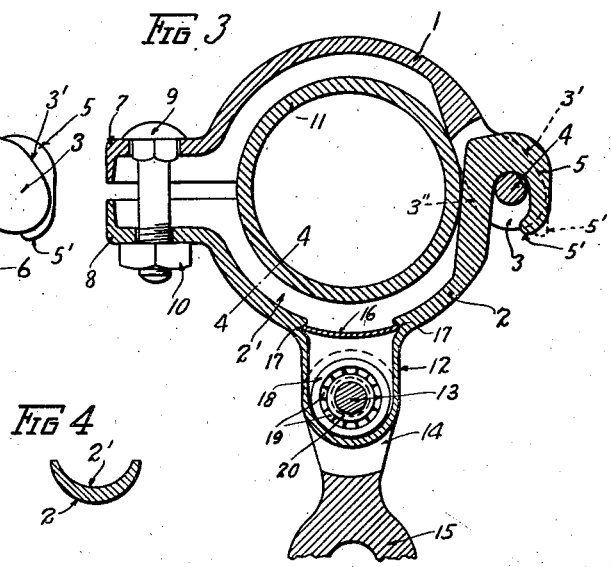
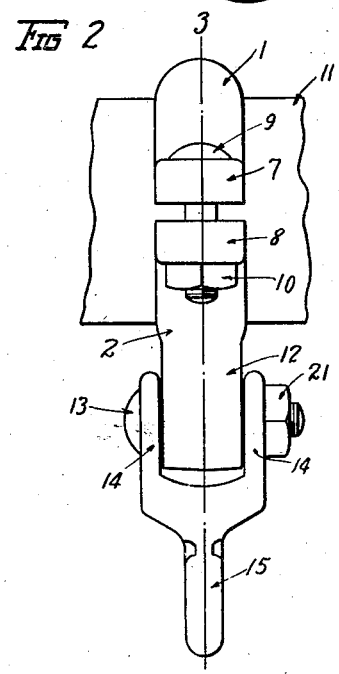
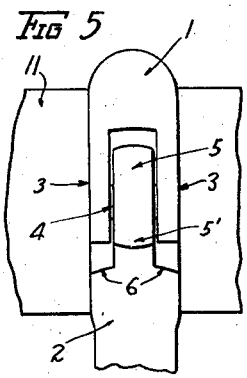
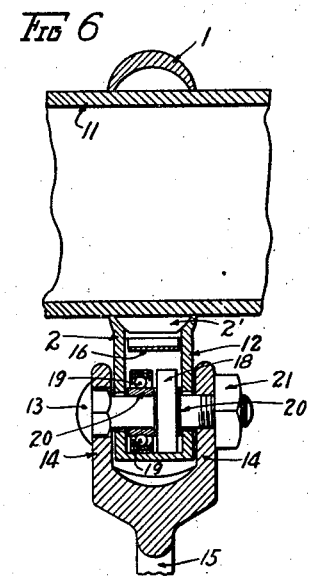
Inventor
Charles E. Hoppes
By Staley & Welch
Attorneys Patented June 17, 1930

1,764,077

UNITED STATES PATENT OFFICE

CHARLES E. HOPPES, OF SPRINGFIELD, OHIO, ASSIGNOR TO EVERWEAR MANUFACTURING COMPANY, OF SPRINGFIELD, OHIO, A CORPORATION OF OHIO

HANGER

Application filed February 29, 1928. Serial No. 257,906.

This invention relates to hangers, the particular hanger illustrated being one especially designed for swings and the like although the invention is not necessarily limited to hangers for that particular purpose.

The type of hanger to which my invention relates is one which embodies a two-part clamp and an eye pivotally connected to one of the members of the clamp.

In hangers of this type it is usual to provide the pivotal connection between the clamp and the eye with anti-friction bearings and one of the objects of my invention is to devise an improved construction for housing the anti-friction bearings such that grease or other lubrication may be supplied to the housing and retained therein.

Another object of the invention is to provide means for hinging the two members of the clamp together.

In the accompanying drawings:

Fig. 1 is an end elevation of a hanger embodying my improvements.

Fig. 2 is a side elevation of the same.

Fig. 3 is a section on the line 3—3 of Fig. 2.

Fig. 4 is a section on the line 4—4 of Fig. 3.

Fig. 5 is an end elevation of the portion of the hanger showing the hinged connection.

Fig. 6 is a section on the line 6—6 of Fig. 1.

Referring to the drawings, 1 and 2 represent the two members of the clamp, each member being cast of general semi-cylindrical shape and of channel form in cross-section as shown in Fig. 4. The member 1 is cored out to form a pair of spaced apart ears 3 connected by integrally-formed, transversely extending pin 4. The other member 2 is provided with an integral hook-shaped member 5, adapted to be inserted between the ears 3 and about the pin 4. The reduced width of the hook results in a pair of shoulders 6, adjacent the base thereof, on the member 2. These shoulders are inclined as shown in Fig. 1 and cooperate with the inner edges of ears 3 to hold the hinged members together. In explanation of this, it will be noticed that the pin 4 is so positioned at one side of the center of the width of the ears and that the pin snugly fits the open part of the hook, which results in the inner portion 3″ of the ears overlying the base of the hook in line with the ears when in normal clamping position. The outer side of the ear is formed with a flat face as indicated at 3′. The result of this is in order to assemble the two members of the clamp the members must be returned so that the flat faces 3′ are adjacent the shoulders until the hook has been placed over the pin, after which the parts are swung to clamping position so as to bring the side 3″ adjacent the shoulders so that before the clamp is applied to the supporting members the shoulders cooperate with the faces 3′ to act as stops to hold the parts together; it being necessary in order to disengage the hinge to spring the member 1 substantially three-fourths of a revolution from the position shown in Fig. 1. Further, after the parts have been assembled the nose 5′ of the hook is bent inwardly as shown above in Fig. 3 so as to prevent disengagement of the hinged members. As the clamp members are cast from malleable iron, the hook may be readily bent as described.

The opposite ends of each member 1 and 2 of the clamp are formed with integral lugs 7 and 8 which when the members are in clamping position stand substantially parallel and are perforated to receive a bolt 9 having a nut 10 by means of which the members 1 and 2 may be clamped firmly to a suitable support which in the present case is a tubular member 11.

The clamping member 2 has integrally cast therewith a centrally-arranged depending housing 12 the side walls of which are perforated to receive a bolt 13 by means of which the yoked portion 14 of an eye 15 may be pivotally connected with the clamp. The housing is cast closed save for the upper end thereof and the perforations through which the bolts extend, athough in practice the upper end is afterwards closed by a cap 16 of flexible material such as metal or card board which is sprung to position with its edges engaged in shallow grooves 17 formed in the middle of the member 2 so that the cap may be readily removed when desired.

This housing is designed to contain antifriction bearings for the bolt 13. These bearings consist of two cages 18 each containing balls 19 arranged about a ring 20 which has a snug fit on the bolt. The bolt is tightly clamped to the forked portion 14 of the eye by the nut 21 so that as the eye swings the bolt and rings 20 oscillate therewith.

The housing is packed with hard grease, and at any time oil may be applied to the housing by applying same to the channel 2', the oil running past the sides of the cap 16 which may be slightly spaced away from the housing as shown in Fig. 6.

Having thus described the invention I claim:

1. In a hanger, a two-part clamp the lower one of which is provided with an integral downwardly depending housing having side walls and a bottom to retain lubricant, a pivot member extending transversely through the side walls of said housing, antifriction bearings in said housing supporting said pivot member, and a hanger member secured to said pivot member.

2. In a hanger, a two-part clamp the lower one of which is provided with an integral downwardly depending housing having side walls and a bottom to retain lubricant, a pivot member extending transversely through the side walls of said housing, antifriction bearings in said housing supporting said pivot member, said lower clamping member being formed with an inner channel leading to the upper end of said housing, and a hanger member secured to said pivot member.

3. In a hanger, a two-part clamp the lower one of which is provided with an integral downwardly depending housing having side walls and a bottom to retain lubricant, a pivot member extending transversely through the side walls of said housing, antifriction bearings in said housing supporting said pivot member, and a hanger member having a yoke embracing said housing and secured to said pivot member.

4. In a hanger, a two-part clamp the lower one of which is provided with an integral downwardly depending housing having side walls and a bottom to retain lubricant, a pivot member extending transversely through the side walls of said housing, antifriction bearings in said housing supporting said pivot member, said lower clamping member being formed with an inner channel leading to the upper end of said housing, and a hanger member having a yoke embracing said housing and secured to said pivot member.

In testimony whereof, I have hereunto set my hand this 24th day of February, 1928.

CHARLES E. HOPPES.